United States Patent
Hannaford et al.

[11] Patent Number: 5,528,955
[45] Date of Patent: Jun. 25, 1996

[54] FIVE AXIS DIRECT-DRIVE MINI-ROBOT HAVING FIFTH ACTUATOR LOCATED AT NON-ADJACENT JOINT

[76] Inventors: Blake Hannaford, 5634-12th Ave. NE., Seattle, Wash. 98105; Manuel R. Moreyra, 6050-6th Ave. NW., Apt. 1, Seattle, Wash. 98107; Pierre-Henry M. J. Marbot, 4742-22nd Ave. NE., Seattle, Wash. 98105

[21] Appl. No.: 302,564

[22] Filed: Sep. 8, 1994

[51] Int. Cl.⁶ .................................. G05G 11/00
[52] U.S. Cl. ................. 74/490.01; 74/49.03; 74/49.04; 901/15; 318/568.1
[58] Field of Search ............... 74/490.01, 490.03, 74/490.04; 901/15, 21, 23; 414/729; 318/568.1, 567.2, 569.21

[56] References Cited

U.S. PATENT DOCUMENTS

| | | | |
|---|---|---|---|
| 3,066,805 | 12/1962 | Sullivan | 901/23 |
| 4,095,481 | 6/1978 | Kasai et al. | 901/15 |
| 4,775,289 | 10/1988 | Kazerooni . | |
| 5,197,346 | 3/1993 | Zona et al. | 74/490.03 |
| 5,207,114 | 5/1993 | Salisbury, Jr. et al. | 901/23 |
| 5,267,483 | 12/1993 | Torii et al. | 901/15 |
| 5,382,885 | 1/1995 | Salcudean et al. | 318/568.1 |

OTHER PUBLICATIONS

Baxter et al., A Hobbyist Robot Arm, Feb. 1979, p. 85 FIG. 1.
Marbot and Hannaford; "Mini Direct Drive Robot Arm for Biomedical Application," IEEE 1991 ICAR Fifth International Conference on Advanced Robotics, Jun. 19–22, 1991 Italy.

Max and Wallace, "Feedback Control of Miniature Direct Drive Devices," Part of Tutorial M–3, Building and Interfacing Miniature Direct Drive Actuators; May 9, 1994.

Wallaces, Richard S.; "Miniature direct Drive Rotary Actuators II: . . . ," Part of Tutorial M–3, Building and Interfacing Miniature Direct Drive Actuators; May 9, 1994.

Marbot, Pierre–Henry; "Mini Direct Drive Robot for Biomedical Applications;" University of Washington Thesis; Oct., 1991.

*Primary Examiner*—Rodney H. Bonck
*Assistant Examiner*—Chong H. Kim
*Attorney, Agent, or Firm*—Steven P. Koda

[57] ABSTRACT

A substantially balanced, five-axis, direct drive mini-robot provides repeatable micro-manipulation to micron precision. Dynamic forces of each link are nearly decoupled from the dynamic forces of remaining links. The robot is generally formed as a shoulder, arm and wrist assembly. At the shoulder a linear actuator drives the robot in a linear horizontal movement along a first axis (e.g., z axis). Two additional actuators at the shoulder provide revolute motion to rotate the arm in an xz plane (e.g., for lateral motion) and a yz plane (e.g., for vertical motion), respectively. A fourth actuator provides rotational motion to move an end-effector (manipulator) at the wrist through a yaw motion. A fifth actuator, positioned at the shoulder and linked to the wrist, provides rotational motion to move the end-effector through a pitch motion.

12 Claims, 7 Drawing Sheets

FIVE AXIS DIRECT-DRIVE MINI-ROBOT HAVING FIFTH ACTUATOR LOCATED AT NON-ADJACENT JOINT

FEDERAL FUNDING STATEMENT

This invention was made with government support under PYI Grant 9058408 awarded by the National Science Foundation. The government has certain rights in the invention.

BACKGROUND OF THE INVENTION

This invention relates to a miniature, direct-drive robotic apparatus, and more particularly to a substantially-balanced, multi-axis, direct-drive mini-robot capable of repeatable movements at micron precision.

Miniature robots are smaller, low-mass robotic devices often having finer precision or smaller work-spaces than large-scale robotic devices. Mini-robots are desirable for space, medical and other applications. In space, economic and other pressures are shifting emphasis from heavy, high-cost complex robotic systems to low-mass, low-cost systems providing fewer functions. In medicine, similar economic pressures are encouraging substitution of traditional surgical operations with less invasive endoscopic operations using miniature robotic devices. An advantage of robotic devices for many applications is that humans can be located away from physical risk. In space humans can avoid the vacuum of space. In medicine humans can avoid proximity to infectious diseases.

Among the many applications contemplated for a mini-robot such as described herein are cell penetration, sample handling, micro-manipulation with scaled force reflection, and tele-operation functions. Cell penetration is useful for membrane potential sensing, voltage clamping, dye injection, micro-injection and genetic engineering. Sample handling is useful for handling sub-micro-liter liquid samples in electrophoresis applications. Micro-manipulation movement having scaled force reflection is useful in various clean room manufacturing processes. Tele-operation is useful for space and other remote applications.

Direct drive of a robot is accomplished with an actuator directly coupled to a load. Mechanical gearing and other transmission elements between the actuator and load are substantially eliminated. To achieve low mass mini-robot devices, mini-actuators are needed. Suitable mini-actuators are found in the computer disk drive industry for 5.25", 3.5" and 2.5" disk drives. Desire for miniaturization in such field is likely to lead to smaller mini-actuators which can be used for mini-robots.

One of the challenges in designing robotic devices and mini-robotic devices is to provide repeatable movements at a desired precision. Effects of inertia, non-linear control responses and friction often hinder repeatable performance. Accordingly, there is a need for a mini-robot capable of repeatable micro-manipulation at micron precision within desired response times.

A three-axis direct-drive mini-robot is described by co-inventors Hannaford and Marbot in "Mini Direct Drive Robot Arm for Biomedical Application;" IEEE, 1991. The robot therein has three closed loop degrees of freedom and one open loop piezo-electric device. Closed loop tip positioning accuracy is to 20 microns, and open loop incremental positioning accuracy is to 1 micron. A work space of approximately 17 cc is available. Herein, co-inventors, Hannaford, Marbot and Moreyra have improved the mini-robot by adding two degrees of freedom and increasing the work space, while limiting inertia effects and other adverse dynamic effects. The five-axis direct drive mini-robot of this invention provides repeatable micro-movements with more dexterous motion and improved precision.

SUMMARY OF THE INVENTION

According to the invention, a substantially balanced, five-axis, direct drive mini-robot provides repeatable micro-manipulation to micron precision. The robot is generally formed as a shoulder, arm and wrist assembly. At the shoulder a linear actuator drives the robot in a linear horizontal movement along a first axis (e.g., z axis). Two additional actuators at the shoulder provide revolute motion to rotate the arm in an xz plane (e.g., for lateral motion) and a yz plane (e.g., for vertical motion), respectively. A fourth actuator provides rotational motion to move an end-effector at the wrist through a yaw motion. A fifth actuator, positioned at the shoulder and linked to the wrist, provides rotational motion to move the end-effector through a pitch motion. The five actuators drive five joints coupled through four links in a kinematic chain, in which each joint moves with one degree of freedom. Motion at the first four joints are directly driven.

According to one aspect of the invention, the fifth actuator is located at a non-adjacent link in the kinematic chain. Typically, an actuator which drives a joint is coupled through an adjacent link. For four of the joints such approach is used to achieve direct drive. However, the fifth joint is indirectly driven by an actuator positioned on a third link at the shoulder, rather than on the adjacent fourth link at the arm. The purpose of positioning the actuator away from the wrist is to maintain a center of gravity near the shoulder, to minimize inertia caused by wrist movement, and to minimize dynamic linking of the fifth joint to the other joints in the kinematic chain.

According to another aspect of the invention, the pitch motion at the wrist is achieved by coupling the fifth joint to the fifth actuator by two pulleys and a belt. The fifth actuator is directly coupled to one pulley (driving pulley) at the shoulder. The other pulley (driven pulley) is coupled to the wrist. An elastic belt couples the driving and driven pulleys to transmit torque to the driven pulley, and thus to the fifth joint. To minimize twisting forces at the wrist, the driving shaft of the driving pulley is coaxial with the axis of the third joint. The fifth joint is the only joint thats actuator is not directly coupled to its link.

According to another aspect of the invention, the belt has sufficient elasticity so as not to hinder the yaw motion at the wrist during movement at the fourth joint, yet sufficient rigidity to minimize structural resonance of the fifth joint.

According to another aspect of the invention, the mini-robot is substantially balanced. By positioning the first, second, third and fifth actuators at the shoulder and the fourth actuator near the shoulder, the five actuators are all positioned in the vicinity of the shoulder. As a result, the mini-robot center of gravity is near the shoulder. This provides a substantially balanced mechanism in which the dynamic forces of each link are nearly decoupled from the dynamic forces of the remaining links.

The moments of inertia for each moving part are minimized by positioning the actuators near the robot center of gravity. For the directly driven joints, the origins of the first three joints nearly intersect. The origins of the first two joints do intersect. The origin of the third joint is slightly offset along the horizontal z-axis in one embodiment to enable a full range of motion for the end-effector. For the indirectly driven fifth joint, the driven shaft is coaxial with the shaft driving the third joint.

According to another aspect of the invention, the arm is used as a shaft to drive the fourth joint through its yaw movement. This enables the fourth joint to be directly driven, although its actuator is positioned near the shoulder at a distance from the wrist. In one embodiment the fourth joint is at an end of the arm at a front side of the shoulder, while the fourth actuator is at an opposite end of the arm at a rear side of the shoulder. The fourth actuator serves as a counterbalance to the weight of the arm and wrist.

One advantage of the invention is that a nearly balanced mechanism is provided by locating the actuators near the shoulder. The actuators tend to be heavier than other robot components. By having a balanced mechanism with a center of gravity near the shoulder, dynamic forces in each link are almost decoupled from dynamic forces in other links.

Another advantage of the invention is that the moment of inertia for the wrist is significantly lower than if the fifth actuator were positioned at the wrist.

Another advantage of the invention is that the well-positioned center of gravity (near the intersection of the first three axes at the shoulder) and the reduced moments of inertia allow for simpler modelling and control implementations of the mini-robot. Simpler models are easier to implement, resulting in efficient software control. Also, faster arm motions are possible without introducing significant nonlinearity into the robot's response.

These and other aspects and advantages of the invention will be better understood by reference to the following detailed description taken in conjunction with the accompanying drawings.

DESCRIPTION OF SPECIFIC EMBODIMENTS

Overview

Figure 1:
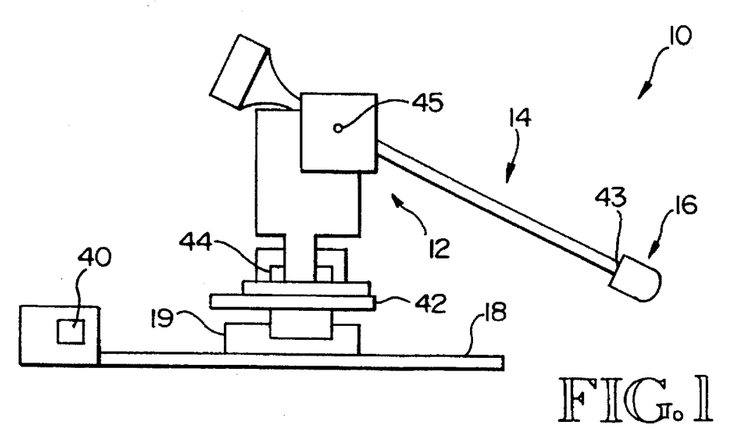
FIG. 1 is a planar side view diagram of the mini-robot according to an embodiment of this invention.

FIG. 1 shows a side view diagram of the mini-robot 10 according to an embodiment of this invention. The mini-robot 10 generally includes a shoulder 12, arm 14 and wrist 16. The function of the mini-robot 10 is to provide micro-manipulation of an end-effector held by the wrist 16, within a specified work space. Several space, medical and manufacturing applications are contemplated, including tele-operation processes, sample handling, and biological cell penetration.

Figure 2:
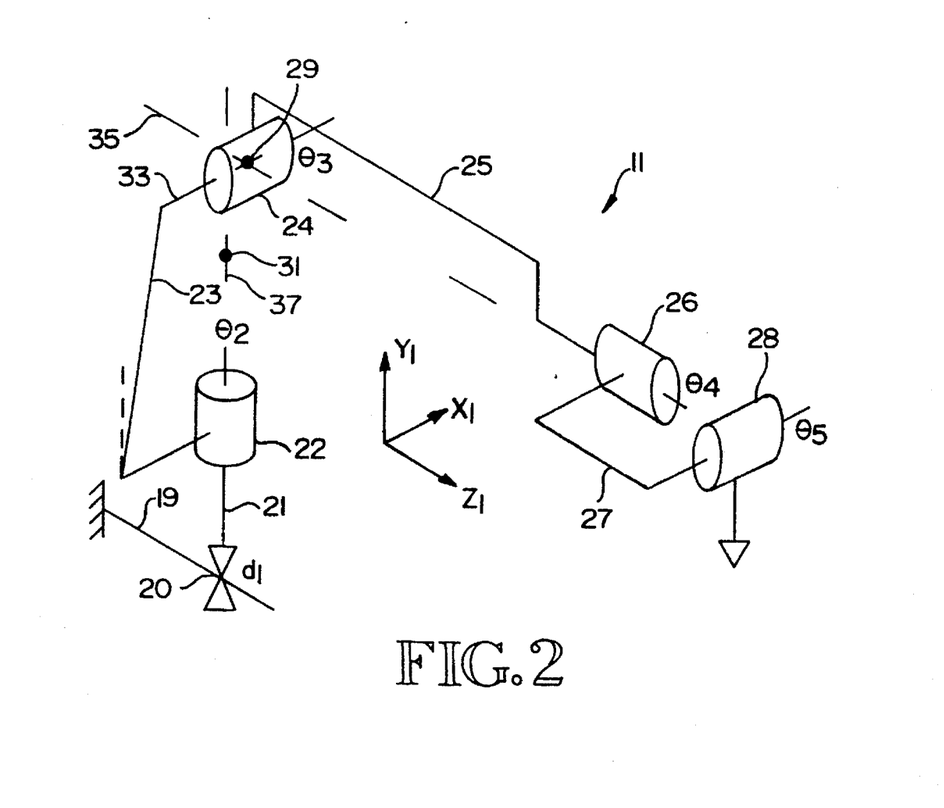
FIG. 2 is a schematic diagram depicting kinematic coupling among joints of the mini-robot of FIG. 1.

To describe the movements of the robot 10, a kinematic model and frames of reference are defined. FIG. 2 shows the kinematic model 11 for a preferred embodiment of mini-robot 10. The robot 10 is represented as a set of links 21, 23, 25, 27 in a chain of five joints 20, 22, 24, 26, 28. Each joint moves with one degree of freedom. The shoulder 12 moves relative to a base 19 (see FIG. 1) at a first joint 20 and a second joint 22. The arm 14 moves relative to the shoulder 12 at a third joint 24. The wrist 16 moves relative to the arm 14 at a fourth joint 26 and a fifth joint 28.

The links 21, 23, 25, 27 connecting the joints 20, 22, 24, 26 and 28 ideally are rigid structures, although in practice, dynamic effects due to less than perfect rigidity occur and are addressed. To achieve a kinematic model 11, link parameters are defined according to the Denavit-Hartenberg convention. Link parameters for an $i^{th}$ link, include link length, $a_i$, link twist, $\alpha_i$, link offset, $d_i$, and joint angle, $\Theta_i$. Link length, $a_{i-1}$, is the distance along a line mutually perpendicular to the axes of joints i−1 and i. Link twist, $\alpha_{i-1}$, is the angle of projection of the axes of joints i−1 and i onto a plane whose normal is the mutually perpendicular link length, $a_{i-1}$. Link offset, $d_1$, is the distance along the common joint axis between neighboring links. Joint angle, $\Theta_i$, is the amount of rotation about the common axis between one link and its neighbor.

To clarify the relationships, dynamic frames of reference are defined. For link i, the z-axis ($Z_i$) points along the $i^{th}$ joint angle. The x-axis ($X_i$) points along the common perpendicular of the $Z_i$ and $Z_{i-1}$ axes. If the $Z_i$ and $Z_{i-1}$ axes intersect, then $X_i$ points normal to the plane containing $Z_i$ and $Z_{i-1}$. The y-axis ($Y_i$) then is the remaining axis orthonormal to $X_i$ and $Z_i$. For the first link 19, the x, y and z axes ($X_1, Y_1, Z_1$) are defined as shown in FIG. 2.

Figure 3:
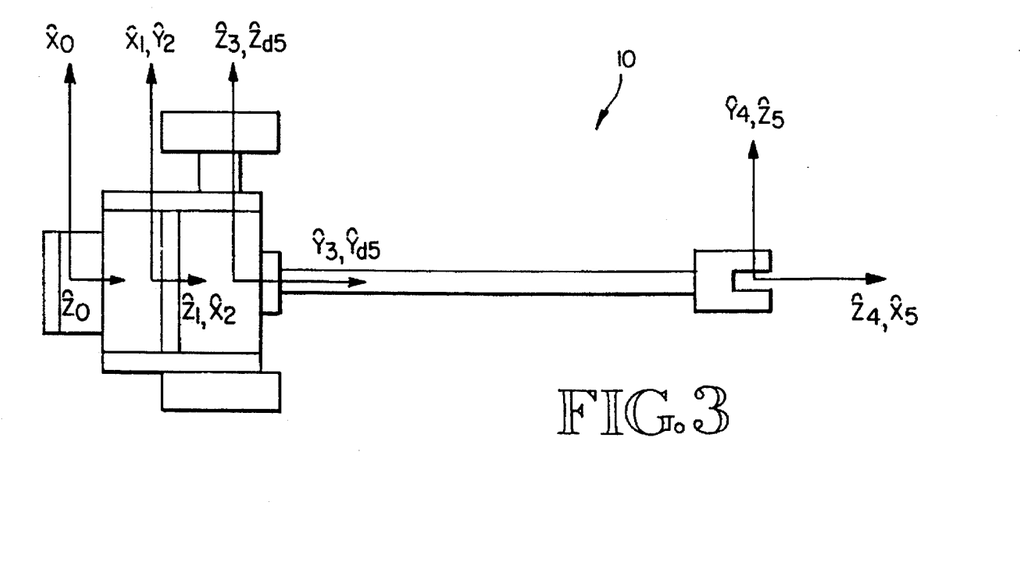
FIG. 3 is a top view of the mini-robot of FIG. 1 showing link reference axes.
Figure 4:
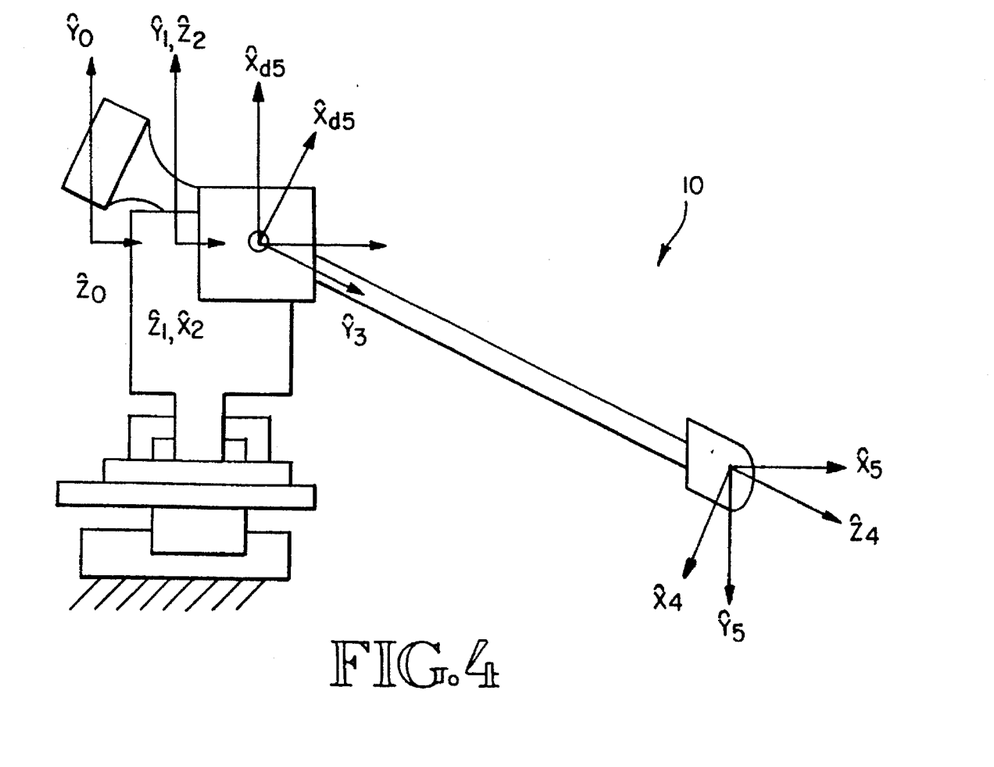
FIG. 4 is a side view of the mini-robot of FIG. 1 showing link reference axes.

FIGS. 3 and 4 show the reference assignments for the first link 19, second link 21, third link 23, fourth link 25 and fifth link 27 according to the Denavit-Hartenberg naming convention. The link parameters for the $i^{th}$ link are defined below based upon such frames of reference:

$a_i$=distance from $Z_i$ to $Z_{i+1}$ measured along $X_i$;

$\alpha_i$=angle between $Z_i$ and $Z_{i+1}$ measured about $X_i$;

$d_i$=distance from $x_{i-1}$ to $X_i$ measured along $Z_i$; and $\Theta_i$=angle between $X_{i-1}$ and $X_i$ measured about $Z_i$.

In one embodiment, the following link parameters occur. Distances are in millimeters and angles are in degrees:

| i | a | α | d | Θ | Home Pos. | Range |
|---|---|---|---|---|---|---|
| 1 | 0 | 0 | $d_1$ | 0 | 0 | $-12.5 \leq d_1 \leq 12.5$ |
| 2 | 0 | −90 | 0 | $\Theta_2$ | −90 | $-105 \leq \Theta_2 \leq -75$ |
| 3 | 12.5 | −90 | 0 | $\Theta_3$ | −60 | $-73 \leq \Theta_3 \leq -47$ |
| 4 | 0 | −90 | 152 | $\Theta_4$ | 180 | $160 \leq \Theta_4 \leq 200$ |

-continued

| i | a | α | d | Θ | Home Pos. | Range |
|---|---|---|---|---|---|---|
| 5 | 0 | −90 | 0 | $\Theta_5$ | −120 | $-140 \leq \Theta_5 \leq -100$ |

The robot motions are next described relative to the $X_1Y_1Z_1$ axes. The first joint 20 (see FIG. 2) is located at position 18 between the shoulder 12 and the mini-robot base 19 (see FIG. 1). A first actuator drives movement at joint 20 to direct a linear horizontal "first" motion $d_1$ along the $Z_1$ axis. A second joint 22 is positioned at the shoulder 12 at location 44. A second actuator drives movement at the second joint 22 to direct a rotational "second" motion $\Theta_2$ about a vertical $Y_1$ axis. A third joint 24 is positioned at the intersection 45 of the shoulder 12 and arm 14. A third actuator drives movement at the third joint 24 to direct a rotational "third" motion $\Theta_3$ about the horizontal $X_1$ axis. A fourth joint 26 is positioned at the intersection 43 of the arm 14 and wrist 16. A fourth actuator drives movement at the fourth joint 26 to direct a rotational "fourth" motion $\Theta_4$ (i.e., yaw) about the $Z_1$ axis. In one embodiment the arm 14 is used as a shaft to create the yaw motion from an actuator mounted to the arm 14. A fifth joint 28 is positioned at the wrist 16. A fifth actuator indirectly drives movement at the fifth joint 28 to define a rotational "fifth" motion $\Theta_5$ (i.e. pitch) about the $X_1$ axis.

Figure 5:
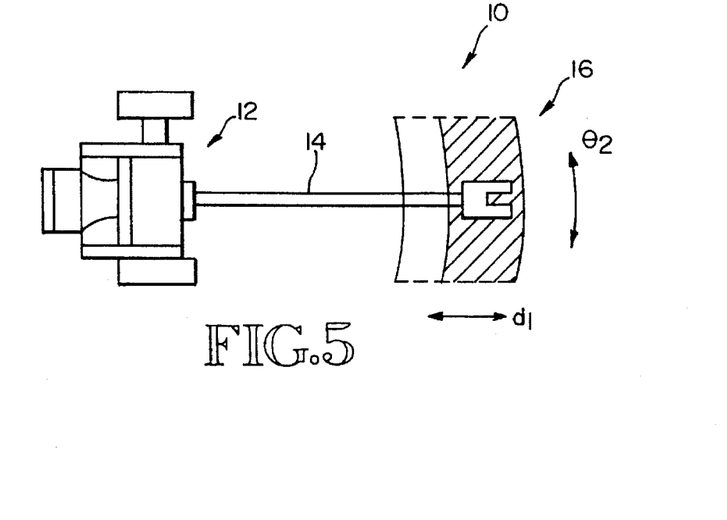
FIG. 5 is a planar top view diagram of the mini-robot of FIG. 1 showing first and second motions.
Figure 6:
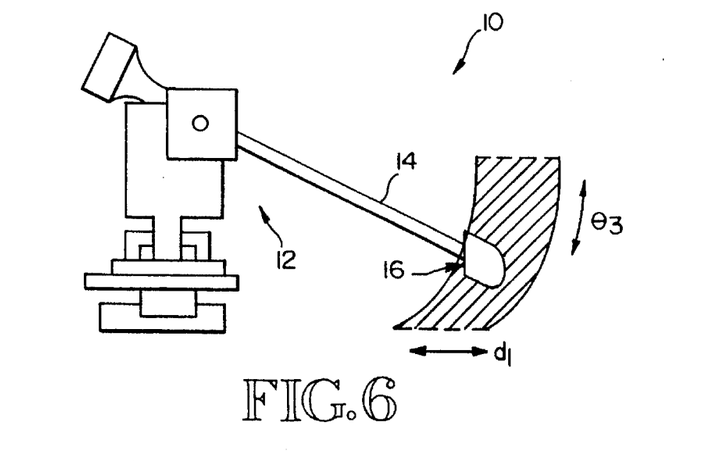
FIG. 6 is a planar side view diagram of the mini-robot of FIG. 1 showing first and third motions.

FIGS. 5–6 show the motions $d_1, \Theta_2, \Theta_3$ as occurring at the wrist 16. Together these motions define a work-space for the mini-robot 10. Work-space is that volume of space which an end-effector attached to the wrist 16 can reach. Work-space categories include dexterous work-space and reachable work-space. Dexterous work-space is the volume which the end-effector can reach with each one of its orientations. Reachable work-space is the volume which the end-effector can reach with at least one of its orientations. An orientation is the range of space that can be reached by moving one joint. Thus, dexterous work-space can be reached by keeping any four joints fixed and moving the other joint for each of the five joints. Reachable work-space can be reached by keeping any four joints fixed and moving the other joint for one or more of the five joints. Thus, dexterous work-space is a subset of the reachable work-space.

In the top view of FIG. 5, horizontal motion $d_1$ and rotational motion $\Theta_2$ define partial boundaries of the work-space. In one embodiment motion $d_1$ has a range of approximately ±12.5 mm. This provide a robot work volume width of approximately 25 mm. Motion $\Theta_2$ has a range of approximately ±15°. For an arm 14 length of approximately 6 inches, this yields a work-space length of approximately 82 mm.

In the side view of FIG. 6, rotational motion $\Theta_3$ defines another bound of the mini-robot work-space. In one embodiment motion $\Theta_3$ has a range of approximately ±13°. For the 6 inch arm length described, and the ±13° angular stroke, a work-space height of approximately 60 mm is achieved.

For the width, length and height described, a dexterous work-space of approximately 120 cc is achieved.

Figure 7:
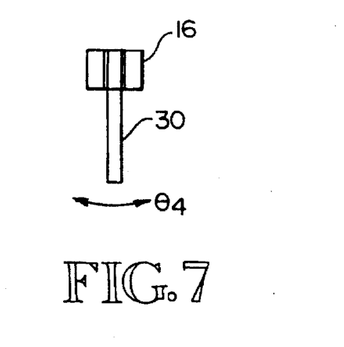
FIG. 7 is a partial block diagram showing the yaw motion of the wrist of FIG. 1.

By considering the motions $\Theta_4$ and $\Theta_5$, reachable work-space is defined. FIG. 7 is a partial front view showing the wrist 16 with a pipette end-effector 30. The pipette is merely one example of an end effector that may be coupled to the wrist 16 to achieve robotic work. The pipette illustrates the rotational yaw motion $\Theta_4$ of the wrist 16. In one embodiment motion $\Theta_4$ has a range of approximately ±20°. As a function of the length of the pipette and the angular stroke of $\Theta_4$, the work-space length increases.

Figure 8:
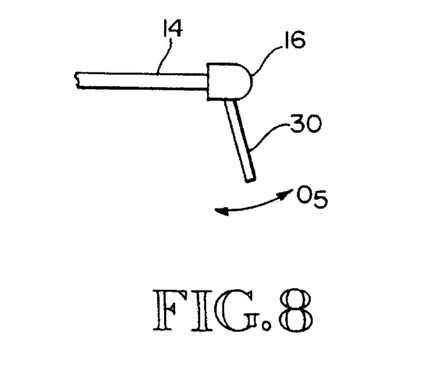
FIG. 8 is a partial block diagram showing the pitch motion of the wrist of FIG. 1.

FIG. 8 is a partial side view showing a portion of the arm 14, the wrist 16 and pipette 30. The pipette illustrates the pitch motion $\Theta_5$ of the wrist 16. In one embodiment motion $\Theta_5$ has a range of approximately ±20°. Depending on the length of the pipette and the angular stroke of $\Theta_5$, the work-space width and height increases. The yaw and pitch motions, $\Theta_4$ and $\Theta_5$, define the remaining bounds on the mini-robot work-space to define a reachable work-space.

Mini-Robot Structure

The robot 10 as previously described generally includes a shoulder 12, arm 14 and wrist 16. Support structures for the first and second joints 20, 22 are shown in block diagram format in FIG. 1. Detailed assembly drawings are shown in FIGS. 9–13 for the remaining portion of the robot 10.

Referring to FIG. 1, a linear bearing 19 supports the robot 10. A first actuator 40 couples the base 18 to a plate 42 supporting the shoulder 12. A second actuator 44 couples the shoulder 12 to the support plate 42. The first actuator 40 defines the linear motion $d_1$ at joint 20 (see FIG. 2). The second actuator 44 defines the rotational motion $\Theta_2$ at joint 22. (see FIG. 2). Note that descriptions of the actuator structures are described below in a separate section.

Figures 9, 10:
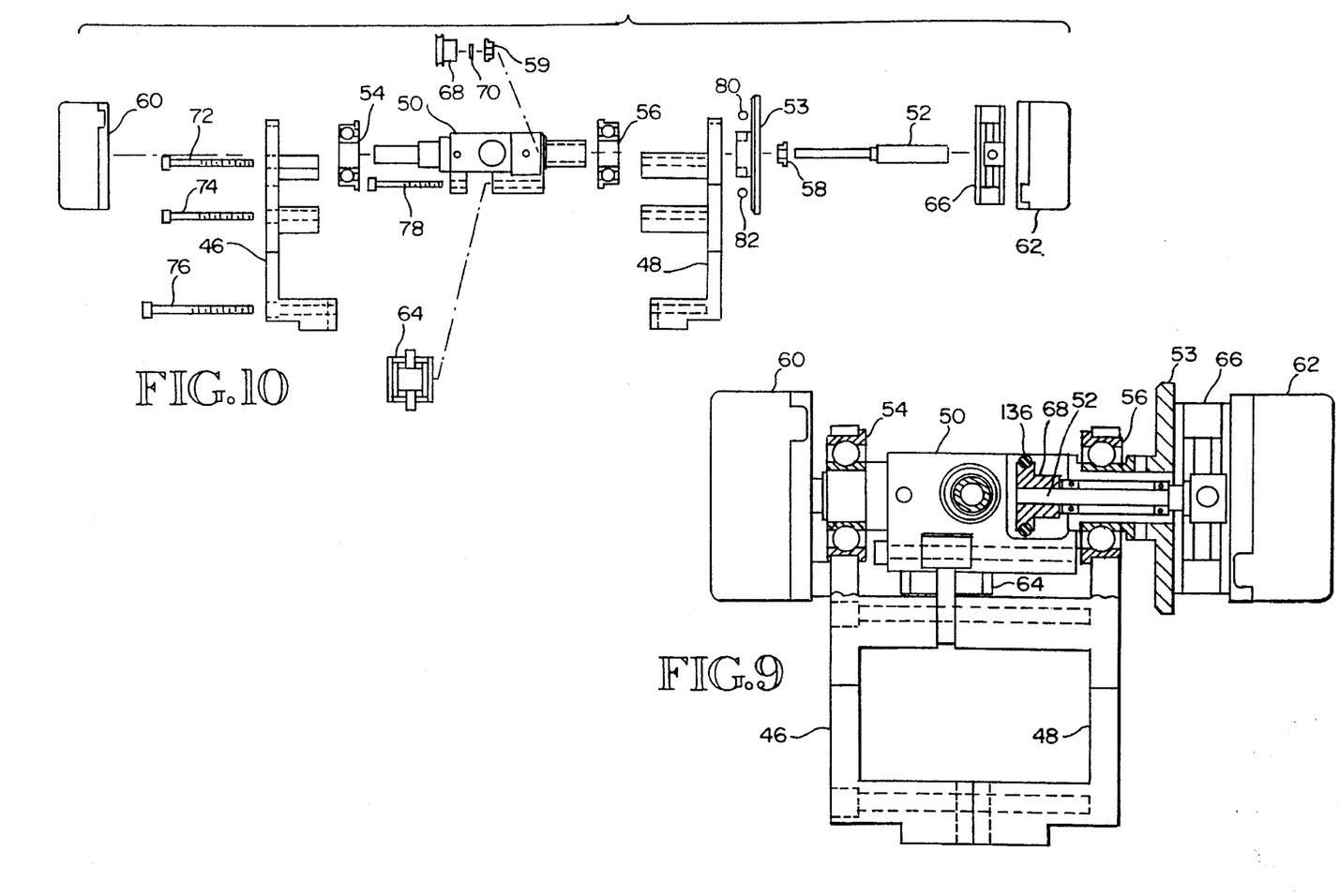
FIG. 9 is a schematic front view diagram of the shoulder of the robot of FIG. 1.
FIG. 10 is an exploded view of the shoulder of FIG. 9.

A detailed assembly of the shoulder 12 is shown in FIGS. 9 and 10. FIG. 10 shows an exploded view of the shoulder assembly. The shoulder 12 includes frames 46, 48, concentric shafts 50, 52, flange 53, flanged bearings 54, 56, 58 and 59, encoders 60, 62, actuators 64, 66, grooved pulley 68, washer 70 and screws 72, 74, 76, 78, 80 and 82. In the preferred embodiment, anodized aluminum is used for casings and components to provide a lightweight durable shoulder assembly. Shafts, however, are formed using steel to provide added stiffness and strength. In the preferred embodiment, the third and fifth actuators 64, 66 drive respective shafts 50, 52 about a common axis.

Figure 11:
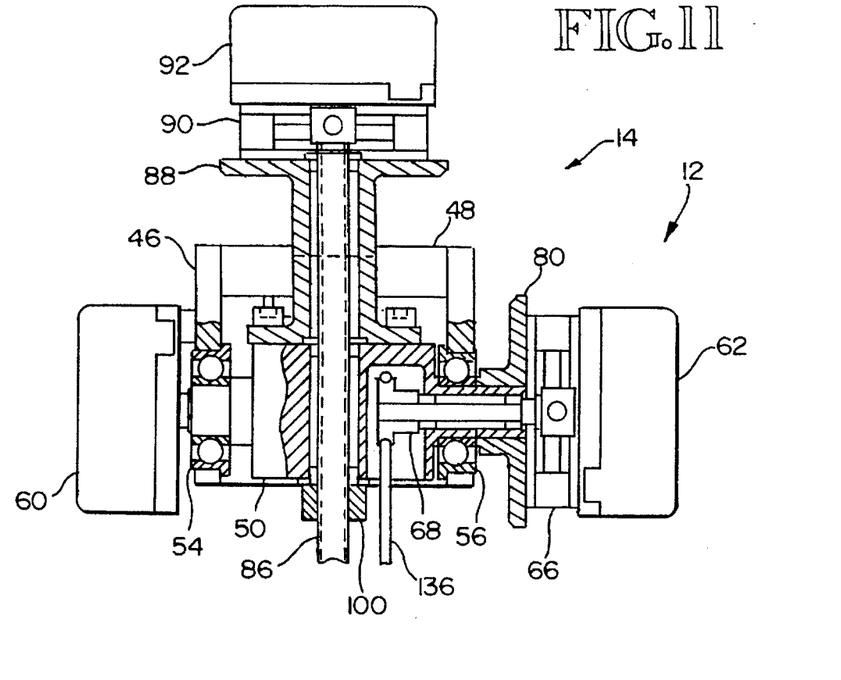
FIG. 11 is a schematic top view diagram of the shoulder and arm of the mini-robot of FIG. 1.
Figure 12:
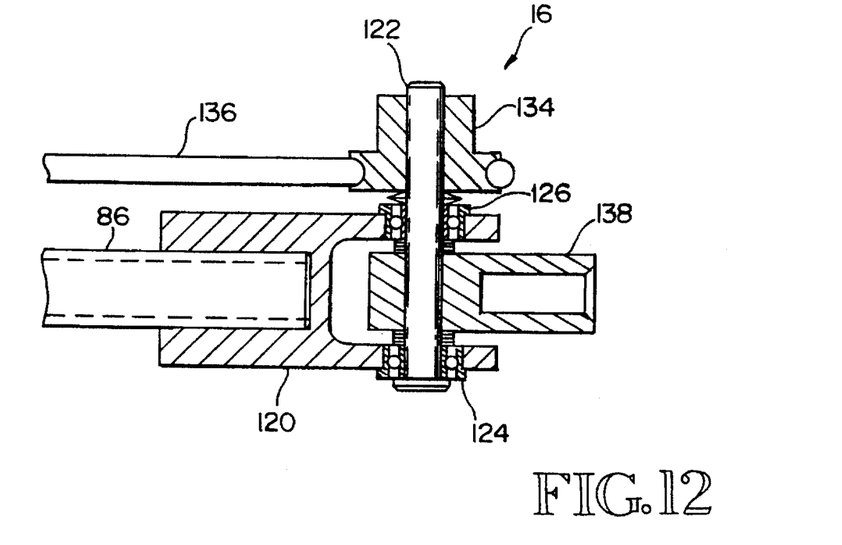
FIG. 12 is a schematic side view diagram of the wrist of the mini-robot of FIG. 1.
Figure 13:
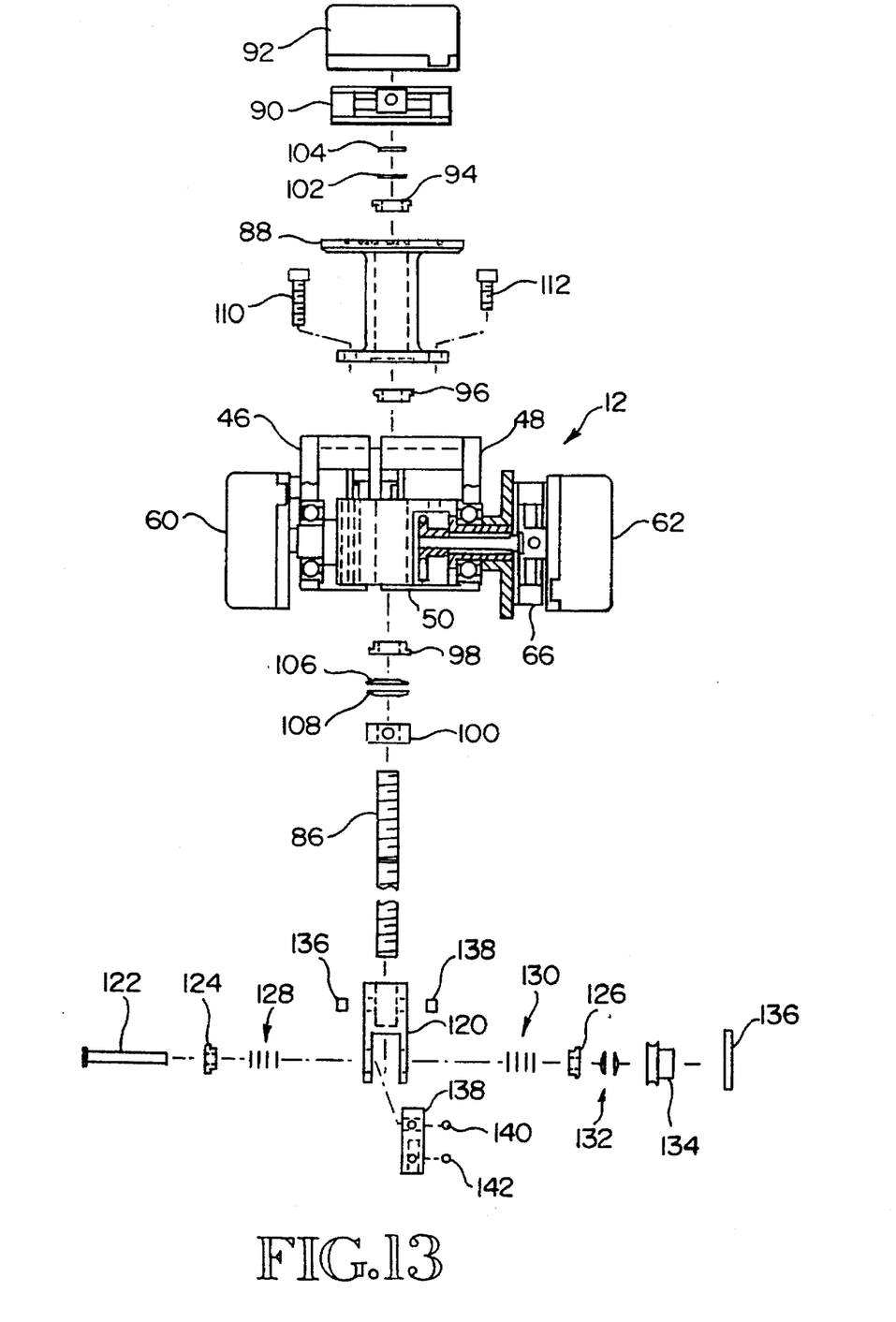
FIG. 13 is an exploded view of the arm and wrist of the mini-robot of FIG. 1.

A detailed assembly of the arm 14 and shoulder 12 are shown in FIG. 11. A detailed assembly of the wrist 16 is shown in FIG. 12. An exploded view of the arm 14 and wrist 16 is shown in FIG. 13. The arm 14 includes an elongated steel shaft 86 which extends from wrist 16 through the shoulder 12. The shaft 86 passes through the shoulder, then through hub 88 to the fourth actuator 90 and encoder 92. Flanged ball bearings 94, 96, 98 enable rotation of the shaft 86 through the hub 88 and shoulder frame 50. A collar 100 and the hub 88 prevent the shaft 86 from sliding through the shoulder frame 50. Other arm 14 components include a spacer 102 and a retaining ring 104 between the hub 88 and actuator 90, washers 106, 108 and screws 110 and 112. To minimize weight in one embodiment the casing materials and components are anodized aluminum. The shaft 86, however, is formed of steel to provide added stiffness and strength.

The wrist 16 as shown in FIGS. 12 and 13 includes a frame 120, shaft 122, flanged ball bearings 124, 126, spacers 128, 130, washers 132, pulley 134 and screws 136, 138. The shaft 122 passes perpendicularly through the frame 120 where it is fastened to the pulley 134. An aramid cable 136 (FIGS. 12, 13) is driven from the third actuator 64 and a pulley 68 at the shoulder 12 (see FIGS. 9 and 11). The cable 136 couples the motion to the pulley 134 which rotates the shaft 122 to cause the pitch motion $\Theta_5$ of an end-effector 138. Set screws 140, 142 secure the end-effector 138 to the shaft 122 within frame 120.

The end-effector 138 is removable and varies for different mini-robot applications and functions. An end-effector is a gripping device or tool fitted to the wrist to perform work. For one robot embodiment, the end effector has a mass of approximately 15 grams or less and produces an inertia of approximately 100 gram-cm$^2$ or less.

Actuators:

In one embodiment, the first actuator 40 is a linear voice coil such as that used by a conventional 5.25 hard disk drive. The voice coil has a coil resistance of 3.4 ohms and a current at maximum load of 2.0 amps.

In one embodiment the second actuator 44 is rotary solenoid having four coils in the solenoid and four ceramic magnets. Such a solenoid is available as Model No. RA16-06A from BEI Motion Systems Company of San Marcos, Calif. Its coils have a resistance of 5.2 ohms and a current at maximum load of 2.0 amps. The solenoid has a peak torque of 0.078 Nm (11 Oz-in) which occurs when the coils are aligned between the magnets. Its torque vs. angle curve is equivalent to $\cos(2\Theta_2)^2$. Its rotor inertia is $4.24 \times 10^6$ kg m$^2$ (0.0006 Oz-in-sec$^2$) and its weight is approximately 100g (3.6 oz). In a preferred embodiment, an alternate rotary actuator 44, such as a conventional computer disk drive actuator, would be implemented.

In one embodiment the third actuator 64 is a rotary voice coil actuator common for a computer disk drive. In BEI Motion Systems model no. RA23-06-001, the moving member includes the coil and weighs 6 g (0.22 oz). The actuator's total weight is 46 (g) (1.6 oz). Its coil resistance is 3.4 ohms and current at maximum load is 1.05 Amps.

In one embodiment the fourth and fifth actuators are modified flat coil head actuators from 1.8 inch hard disk drives. A part of the actuators' rotors opposite the coil is cut out and tapped for set screws which hold a shaft. Thus, the actuators drive respective shafts. Each actuator has a coil resistance of 5.9 ohms and a current at maximum load of 0.65 amps.

Although specific actuators models numbers are provided, numerous mini-actuators may be adapted for the mini-robot 10. Conventional mini-actuators from the increasingly smaller disk drives may result in even smaller actuators for the mini-robot. In addition, mini-actuators specifically designed for robotic applications may be used.

Sensors:

High resolution sensors for detecting micron distances are used in the mini-robot 10. Motion at joint 20 is sensed by a linear variable differential transformer (e.g., LVDT 500 MHR with Signetics NE5521 signal conditioning IC). Using a 12-bit A/D converter, resolution to 4096 counts over a 25.4 mm travel distance yields a precision of 6.2 microns.

Motion at joints 22–28 are sensed by respective incremental rotary position encoders. In one embodiment, the encoders are analog devices generating two sinusoid outputs in quadrature phase. As a result, a high degree of interpolation can occur between each encoder line. Determining the angular position $\Theta_i$ at a joint from the sinusoids is achieved in two stages. First, a coarse position is maintained by passing a threshold adaptation of the sinusoids through a quadrature decoder/counter circuit. The coarse position has an angular resolution equal to four times the number of lines on the encoder. The second stage yields a finer resolution by using relative amplitudes of the two sinusoids to compute a more accurate angular offset. To allow for non-ideal encoder output sinusoids, the encoder signals are modelled as ellipsoidal signals as follows:

$$x = A\cos(\Theta_0)$$

$$y = B\sin(\Theta_0 - \Phi)$$

where x and y are the quadrature outputs of an encoder, $\Theta$ is the actual joint position in radians, $\Phi$ is the phase error between the two quadrature signals, and A and B are constants. The actual angular position of the joint then is derived as:

$$\Theta_0 = \operatorname{atan2}(Ay + Bx\sin\Phi,\ Bx\cos\Phi)$$

then divided by $\pi$ to scale the position to encoder lines.

Mechanical Properties

Mass Properties:

The robot structures were selected and positioned to provide a balanced mechanism which minimizes dynamic force transmission between components. The center of gravity for the second, third, fourth and fifth links 21, 23, 25, and 27 preferably is at or near the axis of the second joint 22 so that acceleration of the first joint 20 generates little torque in second joint 22. The center of gravity of the third, fourth and fifth links 23, 25, and 27 preferably is at or as close as possible to the axis of third joint 24 so that the angular acceleration of second joint 22 will generate little torque in third joint 24. In one embodiment, the center of gravity 29 of the accumulated masses of the third, fourth and fifth links 23, 25, 27 is at approximately the intersection of the axes 33, 35 of the third and fourth joints 24, 26. (See FIG. 2). In one embodiment the center of gravity 31 of the accumulated masses of the second, third, fourth and fifth links 21, 23, 25 and 27 is approximately on axis 37 below the other center of gravity point 29. (See FIG. 2).

The rotation of the fourth and fifth joints 26, 28 preferably have little effect on the accumulated inertias reflected in the axes of the second and third joints 22 and 24 so that shoulder dynamics are substantially decoupled from the wrist 16.

To minimize robot mass most components are made of aluminum, except for the shafts which are made of steel. In one embodiment the masses of moving parts in links 21–27 total less than 900 grams.

Structural Resonance:

To control the position of the mini-robot to micron precision levels it is desirable to achieve a rigid structure and drive system. Flexibilities in the structure or drive system cause resonances which adversely impact manipulator performance. Resonances are to be minimized without sacrificing the benefit of light weight and low inertia. Conventional industrial manipulators have structural resonances in the range of 5 Hz to 25 Hz and drive system resonances approaching 70 Hz.

The most flexible parts of the robot 10 are the arm shaft 86 and drive belt 136. The arm 14 is implemented in one embodiment as a tubular cantilever beam with one end fixed near the shoulder and the other end free at the wrist. It has a stiffness characteristic and resonance defined as follows:

$$k = 3\pi E(d_o^4 - d_i^4)/64 l^3$$

where
- k = stiffness;
- E = modulus of elasticity;
- $d_i$ = inner diameter of shaft;
- $d_o$ = outer diameter of shaft; and
- l = length of shaft measured from point fixed.

$$w_n = \sqrt{k/m}$$

where
- $w_n$ = natural "resonant" frequency
- k = stiffness
- m = mass of wrist elements.

To reduce stiffness in the transmission belt 136 a synthetic aramid-filament cable with turnbuckles is used in one embodiment. Other cable materials also may be used, such as stainless steel or an O-ring elastomer (e.g., Buna-N). The aramid and stainless steel cables use one or two turnbuckles to preload the cable to a desired tension. The aramid cable exhibits the preferred stiffness characteristics.

Mini-Robot Kinematic Response

Each embodiment of the robot 10 has a kinematic response to actuated motions in robot joints. Following are descriptions of various kinematic characteristics of one embodiment of the mini-robot 10. These characteristics are useful for determining the sophistication of software used for controlling the mini-robot activities.

Following is a matrix defining the kinematic transformation between a link and an adjacent link for each link, i=1,5:

$$^{i-1}_{i}T = \begin{vmatrix} \cos\Theta_i & -\sin\Theta_i & 0 & a_{i-1} \\ \sin\Theta_i\cos\alpha_{i-1} & \cos\Theta_i\cos\alpha_{i-1} & -\sin\alpha_{i-1} & -\sin\alpha_{i-1}d_i \\ \sin\Theta_i\sin\alpha_{i-1} & \cos\Theta_i\sin\alpha_{i-1} & \cos\alpha_{i-1} & \cos\alpha_{i-1}d_i \\ 0 & 0 & 0 & 1 \end{vmatrix}$$

Following are equations deriving joint positions, $d_1$, $\Theta_2$, $\Theta_3$, that achieve a desired known end-effector position ($p_x$, $p_y$, $p_z$). The known end-effector position is defined relative to axes, $X_1$, $Y_1$, $Z_1$.

$$\Theta_3 = \text{atan } 2[-p_y/152, -(1(1-(p_y/152)^2)^{1/2}];$$

$$\Theta_2 = \text{atan } 2\{[p_x/(12.5-152 \sin \Theta_3)], -[1-(p_x/(12.5-152 \sin \Theta_3))^2]^{1/2}\}$$

$$d_1 = p_z - 152 \sin \Theta_2 \sin \Theta_3 + 12.5 \sin \Theta_2$$

Following are equations for deriving the velocity propagation among links. The velocities of each link i+1 are equal to those of link i, plus whatever new velocity components are added by movement at joint i+1. The angular velocity of link i+1 is given as:

$$^{i+1}W_{i+1} = {}^{i+1}_{i}R^{i}W_i + \Theta_{i+1}{}^{i+1}\hat{Z}_{i+1}$$

where, $^{i+1}_{i}R$ is the rotation matrix mapping $^{i}p$ on $^{i+1}p$;
$\Theta_{i+1}$ is the joint velocity of joint i+1;
and
$^{i+1}\hat{Z}_{i+1}$ is the vector $[0\ 0\ 1]^T$ The linear velocity of the link i+1 is given as:

$$^{i+1}v_{i+1} = {}^{i+1}_{i}R({}^{i}v_i + {}^{i}W_i \times {}^{i}P_{i+1})$$

where $^{i}P_{i+1}$ is the vector of the origin of frame i+1 with respect to frame i.

For a prismatic joint, the velocity equations are:

$$^{i+1}w_{i+1} = {}^{i+1}_{i}R^{i}w_i;$$

and $$^{i+1}v_{i+1} = {}^{i+1}_{i}R({}^{i}v_i + {}^{i}w_i \times {}^{i}P_{i+1}) + \dot{d}_{i+1}{}^{i+1}\hat{Z}_{i+1}$$

Mini-Robot Dynamic Response

Dynamic forces also act upon the robot components during movement. Link acceleration equations are defined below followed by Newton-Euler equations to account for torques and joint driving forces required to cause motion. Link accelerations from one link to the next are defined. Angular acceleration is given as:

$$^{i+1}\dot{w}_{i+1} = {}^{i+1}_{i}R^{i}\dot{w}_i + {}^{i+1}_{i}R^{i}w_i \times \Theta_{i+1}{}^{i+1}\hat{Z}_{i+1} + \ddot{\Theta}_{i+1}{}^{i+1}\hat{Z}_{i+1}$$

Linear acceleration is given as:

$$^{i+1}\dot{v}_{i+1} = {}^{i+1}_{i}R[{}^{i}\dot{v}_i + {}^{i}\dot{w}_i \times {}^{i}P_{i+1} + {}^{i}w_i \times ({}^{i}w_i \times {}^{i}P_{i+1})]$$

For a prismatic joint, the link acceleration equations are:

$$^{i+1}\dot{w}_{i+1} = {}^{i+1}_{i}R^{i}\dot{w}_i;$$

and $$^{i+1}\dot{v}_{i+1} = {}^{i+1}_{i}R[{}^{i}\dot{v}_i + {}^{i}\dot{w}_i \times {}^{i}P_{i+1} + {}^{i}w_i \times ({}^{i}w_i \times {}^{i}P_{i+1})] + \ddot{d}_{i+1}{}^{i+1}\hat{Z}_{i+1} + 2{}^{i+1}w_{i+1} \times \dot{d}_{i+1}{}^{i+1}\hat{Z}_{i+1}$$

The forces and moments of a joint are defined as:
Outward iterations i=0–4:

$$^{i+1}F_{i+1} = m_{i+1}{}^{i+1}\dot{v}_{Ci+1}$$

where m is the mass of link i+1; and
$^{i+1}v_{ci+1}$ is the acceleration of the center of gravity of link i+1.

$$^{i+1}N_{i+1} = {}^{ci+1}I_{i+1}{}^{i+1}\dot{w}_{ci+1} + {}^{i+1}w_{ci+1} \times {}^{ci+1}I_{i+1}{}^{i+1}w_{ci+1}$$

Inward iterations i=5–1:

$$^{i}f_i = {}^{i}_{i+1}R^{i+1}f_{i+1} + {}^{i}F_i$$

$$^{i}n_i = {}^{i}_{i+1}R^{i+1}n_{i+1} + {}^{i}N_i + {}^{i}P_{ci} \times {}^{i}F_i + {}^{i}P_{i+1} \times {}^{i}_{i+1}R^{i+1}F_{i+1}$$

where $^{i}P_{ci}$ is the vector of the center of gravity of link i in frame i.

For rotational joints, torque is $$\tau_i = {}^{i}n_i^T\hat{Z}_i$$

For prismatic joints the force is:

$$\tau_i = {}^{i}f_i^T\hat{Z}_i$$

With factors for gravity and pulley tension included, the mini-robot dynamic equations are represented as a state space equation:

$$\tau = M(\Theta)\ddot{\Theta} + V(\Theta,\dot{\Theta}) + D(\Theta) + G(\Theta)$$

where $M(\Theta)$ is a 5×5 mass matrix, $v(\Theta,\dot{\Theta})$ is a 5×1 vector of centrifugal and Coriolis forces, $D(\Theta)$ is a 5×1 vector of pulley tension and $G(\Theta)$ is a 5×1 vector of gravity.

Control Model and Control System

Figure 14:
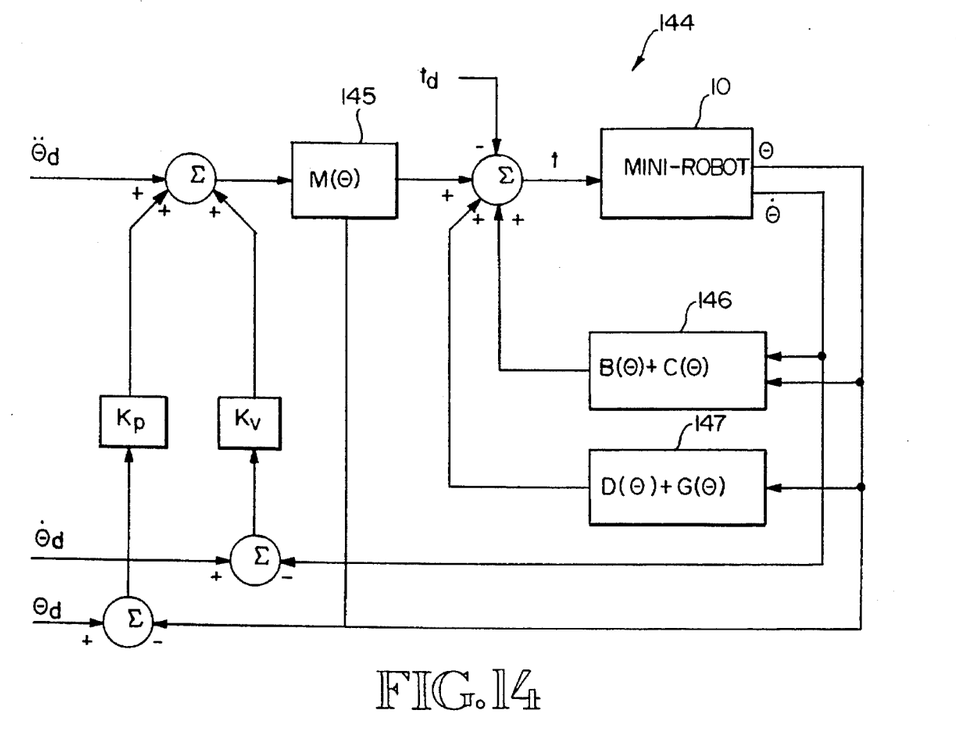
FIG. 14 is a block diagram of a control model for the mini-robot of FIG. 1.

FIG. 14 shows one embodiment of a control system model 144. The dynamic responses are expressed as functions of position only, but are updated at a rate slower than the rate of the closed loop servo. Joint angle, velocity and acceleration are calculated and input to the model 144, along with the torque at a joint. Gain factors for position and velocity, $K_p$ and $K_v$, are used in deriving acceleration. In deriving a new joint position, the model 144 considers mass effects, $M(\Theta)$, centrifugal forces, $B(\Theta)$, Coriolis forces, $C(\Theta)$, belt tension, $D(\Theta)$, and gravitational effects $G(\Theta)$.

During computer simulation, alternative model schemes achieved similar performance. More specifically, control did not suffer when varying between a complete model of kinematic and dynamic equations to simpler linear or wrist-decoupled models. It was found that a control system could be implemented as a complex model of the complete kinematic and dynamic equations or as one of several simpler models, including a wrist-decoupled model, a linearized state space model, and linearized state space model using only a diagonal mass matrix.

The comparable results using simpler models is attributed to the mechanical design and layout in which a center of gravity near the shoulder, and small torque moment arms are achieved. Such attributes significantly reduce nonlinear dynamic effects.

Accordingly, alternative control systems can be adapted to control the mini-robot 10. Because simple control models may be implemented, control software processing times are less than otherwise. Thus, a faster control cycle and/or faster motions and response time are accomplished.

Figure 15:
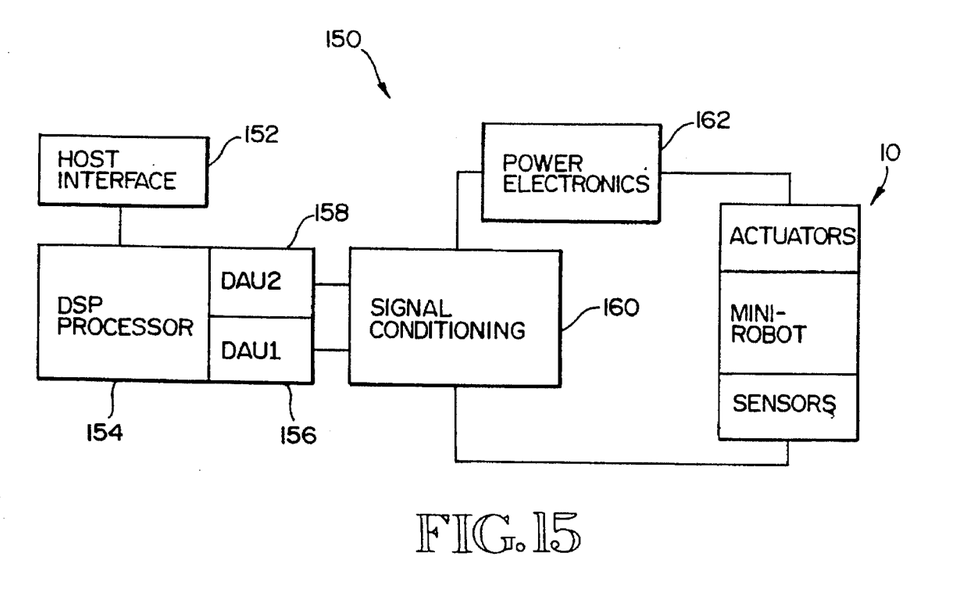
FIG. 15 is a block diagram of a control system for the mini-robot FIG. 1.

FIG. 15 shows a block diagram of a control system 150 for the mini-robot 10. According to desired applications, a user directly controls robot 10 motion or requests an automated task motion via a host computer (not shown). The host issues commands to the control system 150 through a host interface 152. In one embodiment, the interface 152 is an RS 232-compatible serial communications port. A digital signal processor 154 derives actuator commands and reads encoder positions to define the robot motion at a given time. Input and output to the robot 10 occurs through D/A channels. In one embodiment, I/O daughter cards 156, 158 respectively include 4–33 kHz 12-bit A/D channels and 4–33 kHz 12-bit D/A channels, plus 8 bits of digital input and 16 bits of digital output.

Signal conditioning circuits 160 condition output signals to the mini-robot actuators and input signals from the mini-robot encoders (i.e., sensors). Power electronics 162 drive the robot electronic components.

Control software is resident in the processor 154 or host and written in C language or another language known to programmers skilled in the art of robotics control systems.

Problem and Means for Solving Problem

The problem addressed by the invention is how to achieve a miniature robotic device capable of repeatable movements to micron precision along five degrees of freedom while preserving the ability to accurately and rapidly control contact forces. The solution provided is to create a substantially balanced direct-drive robot having small moments of inertia to reduce inertia effects and minimize dynamic coupling among robot joints. Mechanical components are selected to have high stiffness, low weight and low inertia.

Actuator output is directly coupled to the first four links in a kinematic chain of five joints. The fifth joint is indirectly driven by a belt and pulley arrangement. The actuator for the fifth joint is located at a non-adjacent link (e.g., 3rd link). Such positioning reduces the mass on the robot wrist 16 which would have otherwise had a higher inertia and lower resonant frequency. An aramid filament is used in one embodiment for the belt to increase its structural resonant frequency.

The fourth joint is driven from an actuator positioned near the shoulder rather than at the wrist. To achieve the yaw motion at the wrist from such fourth actuator, the arm 14 serves as the shaft of rotation. Such configuration provides low inertia, high torsional stiffness and relatively high structural resonance.

The mini-robot 10 is a non-linear time-varying dynamic system. Linearized models are used to cancel the non-linearities over various portions of the robot operating range. The high stiffness, low inertia, and near balance structure enables such linear models to be used satisfactorily.

Meritorious and Advantageous Effects

One advantageous effect of the mechanical structure of the robot is that a nearly balanced mechanism is provided. A significant contribution to achieving balance is the location of the fifth actuator and, in turn, center of gravity, near the shoulder. Dynamic forces in each link are almost decoupled from dynamic forces in other links. Another advantageous effect of the fifth actuator positioning is that the moment of inertia for the wrist is significantly lower than if the fifth actuator were positioned at the wrist. This simplifies the dynamic relationship of the fifth joint to the remaining joints.

Another advantage of the robot structure is that the well positioned center of gravity and reduced moments of inertia allow for simpler modelling and control implementations of the mini-robot. Simpler models are easier to implement, resulting in efficient software control. Also, faster arm motions are possible without introducing significant nonlinearity into the robot's response.

Although a preferred embodiment of the invention has been illustrated and described, various alternatives, modifications and equivalents may be used. For example, although aluminum and steel components are described for the preferred embodiment, other materials exhibiting light weight and high stiffness also may be used. Also, although an aramid filament cable is described, other light weight synthetic or non-synthetic filaments or cables may be used. Also, as mini-actuator technology advances, smaller actuators of lighter weight may become available and be used. Therefore, the foregoing description should not be taken as limiting the scope of the inventions which are defined by the appended claims.

What is claimed is:

1. A mini-robot apparatus, comprising five joints respectively connected by first, second, third and fourth links in a kinematic chain, each joint movable in one degree of freedom, the first four joints in the chain directly driven by four respective actuators, the last joint in the chain indirectly driven by a fifth actuator positioned at a non-adjacent link; and in which the kinematic chain is formed by a shoulder assembly, arm assembly and wrist assembly which together have a center of gravity in vicinity of the shoulder assembly;

the shoulder assembly comprising the first link, second link and third link and a first actuator, second actuator and third actuator, the first actuator for directly driving manipulation of said first joint to define a first degree of freedom, the second actuator directly driving manipulation of said second joint to define a second degree of freedom, the third actuator for directly driving manipulation of the third joint to define a third degree of freedom;

the arm assembly comprising a fourth link and a fourth actuator, the fourth actuator for directly driving the wrist assembly to rotate, said rotation of the wrist assembly defining a fourth degree of freedom;

the wrist assembly comprising a first pulley having a fixed orientation relative to the wrist assembly;

the shoulder assembly further comprising the fifth actuator and a second pulley, the second pulley having a fixed orientation at the shoulder assembly relative to the third link, the second pulley having a drive axis coaxial with a drive axis of the third actuator, the first and second pulley mechanically coupled by an elastic drive belt, the fifth actuator driving the wrist assembly relative to the arm assembly via the pulleys and belt to define a fifth degree of freedom, wherein length of the drive belt varies as the first pulley and wrist assembly rotate relative to the second pulley and the shoulder assembly.

2. The mini-robot apparatus of claim 1, in which origins of the first and second joints intersect along a common axis, and in which origin of the third joint is slightly offset from said common axis.

3. The mini-robot of claim 1, in which dynamic forces in a fourth link coupling the fourth and fifth joints are substantially decoupled from dynamic forces in the remaining three links.

4. A mini-robot apparatus, comprising:

a shoulder assembly, arm assembly and wrist assembly and having a center of gravity in vicinity of the shoulder assembly wherein the arm assembly is mechanically coupled to the shoulder assembly and the wrist assembly is mechanically coupled to the arm assembly;

the shoulder assembly comprising a first actuator and second actuator for directly driving manipulation of the shoulder assembly in two degrees of freedom, respectively, and a third actuator for directly driving cantilever vertical rotation of the arm assembly in one degree of freedom relative to a joint coupling the arm assembly to the shoulder assembly;

the arm assembly comprising an elongated shaft and a fourth actuator, the fourth actuator for directly driving the wrist assembly in one degree of freedom, the fourth actuator mechanically coupled to one end of the shaft and the wrist assembly mechanically coupled to an opposing end of the shaft, the joint coupling the arm assembly and shoulder assembly being located between said one end and opposing end of the shaft;

the wrist assembly comprising a first pulley;

the shoulder assembly further comprising a fifth actuator and a second pulley, the second pulley having a drive axis coaxial with a drive axis of the third actuator, the first and second pulley mechanically coupled by a drive belt, the fifth actuator driving the wrist assembly relative to the arm assembly via the pulleys and belt in one degree of freedom.

5. The mini-robot of claim 4, in which the shoulder assembly, arm assembly and wrist assembly together form five joints including said coupling joint, said five joints connected by four links in a kinematic chain, each joint movable in one of said five degrees of freedom, the first four joints in the chain directly driven by said first, second, third and fourth actuators, respectively, the fifth joint indirectly driven by said fifth actuator positioned at a non-adjacent link.

6. The mini-robot of claim 4, in which an axis of rotation of said second pulley is coaxial to an axis of rotation of a shaft driven by said third actuator to minimize twisting forces at the wrist assembly during motions driven by said third actuator.

7. A mini-robot apparatus, comprising:

a shoulder assembly, arm assembly and wrist assembly together forming five joints connected by four links in a kinematic chain, each joint movable in one degree of freedom, the apparatus having a center of gravity in vicinity of the shoulder assembly, the arm assembly being mechanically coupled to the shoulder assembly at a third joint of the five joints and the wrist assembly being mechanically coupled to the arm assembly at a fourth joint of the five joints;

the shoulder assembly comprising a first actuator and a second actuator for directly driving manipulation, respectively, of a first and a second joint in said chain, and a third actuator for directly driving a cantilever vertical rotation of the arm assembly at the third joint;

the arm assembly comprising an elongated shaft and a fourth actuator, the fourth actuator for directly driving the fourth joint in said chain, the fourth actuator mechanically coupled to one end of the shaft and the wrist assembly mechanically coupled to an opposing end of the shaft, the fourth joint being located between said one end and opposing end of the shaft;

the wrist assembly comprising a first pulley having a fixed orientation relative to the wrist assembly for linking motion to a fifth joint in said chain;

the shoulder assembly further comprising a fifth actuator and a second pulley, the second pulley having a fixed orientation relative to a third link of the four links, the third link located at the shoulder assembly and a drive axis coaxial with a drive axis Of the third actuator, the first and second pulley mechanically coupled by an elastic drive belt, the fifth actuator driving motion of the wrist assembly relative to the arm assembly via the pulleys and belt, the fifth actuator being located at a non-adjacent link to said fifth joint in the kinematic chain, and wherein length of the belt varies as the first pulley and wrist assembly rotate relative to the second pulley and shoulder assembly.

8. The mini-robot apparatus of claim 7, in which origins of the first and second joints intersect along a common axis, and in which origin of the third joint is slightly offset from said common axis.

9. The mini-robot of claim 7, in which dynamic forces in a fourth link coupling the fourth and fifth joints are substantially decoupled from dynamic forces in the remaining three links.

10. The mini-robot of claim 7, in which an axis of rotation of said second pulley is coaxial to an axis of rotation of a shaft driven by said third actuator to minimize twisting forces at the wrist assembly during motions driven by said third actuator.

11. The mini-robot of claim 1, in which an axis of rotation of said second pulley is coaxial to an axis of rotation of a shaft driven by said third actuator to minimize twisting forces at the wrists assembly during motions driven by said third actuator.

12. The mini-robot of claim 11, in which the arm assembly further comprises an elongated shaft coupling the fourth actuator to the wrist assembly, the fourth actuator located near the shoulder assembly and driving the shaft to directly couple motion to said wrist assembly.

* * * * *